Patented Dec. 19, 1933

UNITED STATES PATENT OFFICE 1,940,092

CONDENSATION PRODUCTS OF RESINIC ACIDS

Hans Krzikalla, Mannheim, and Werner Wolff, Ludwigshafen - on - the - Rhine, Germany, assignors to I. G. Farbenindustrie Aktiengesellschaft, Frankfort-on-the-Main, Germany No Drawing. Application June 23, 1930, Serial No. 463,356, and in Germany June 24, 1929

14 Claims. (Cl. 260—98)

The present invention relates to the production of condensation products of oils, or waxes and the like with resinic acids.

We have found that valuable condensation products are obtained by heating an aliphatic non-drying hydroxy acid which term is meant to comprise derivatives of the said acids, such as their esters, for example saturated or unsaturated non-drying oils, or waxes, containing hydroxy groups, with a resinic acid for example colophony, abietic acid and the like. As aliphatic hydroxy acids and their derivatives suitable for the purpose of our invention there may be mentioned castor oil, ricinoleic acid, hydroxystearic acids, for example dihydroxystearic acid, and their esters.

The condensation may be carried out by heating the components, if desired, in vacuo or while passing an inert gas through them. The process is best carried out at temperatures above 200° C. The process may also be carried out in the presence of acid or alkaline condensing agents or/and organic diluents, and almost acid-free viscous oily or waxy products are obtained which are more viscous or more hard than the initial oils and may be employed with advantage as softening agents for artificial masses, as lubricants and for other industrial purposes. Apparently an esterification of the resinic acids with the alcoholic group of the hydroxyl bearing reaction components occurs, since water is split off in the reaction and the acid value of the products is decreased in comparison to that of the initial materials.

The following examples will further illustrate how this invention may be carried out in practice, but the invention is not restricted to these examples. The parts are by weight.

Example 1

150 parts of castor oil and 50 parts of colophony are heated at a pressure of 15 millimeters mercury gauge at 260° centigrade for 6 hours. A clear pale yellow very viscous oil is obtained.

By employing from 100 to 150 parts of colophony for each 150 parts of castor oil in the condensation, the almost neutral oil obtained is still more viscous and is readily miscible with paraffin oil. It is eminently suitable as a softening agent for celluloid condensation products of formaldehyde with urea or phenols, casein and the like.

Hydroxy stearic acid esters or other similar oils or waxes containing hydroxy groups may be employed instead of castor oil.

Example 2

15 parts of ricinoleic acid are heated together with 13.5 parts of colophony for 10 hours at 250° centigrade at a pressure of about 20 millimeters mercury gauge. While water is split off and the acid value is reduced, a brown, highly viscous oil is obtained which is soluble in most organic solvents with the exception of the lower members of the aliphatic alcohol series.

Example 3

3.4 parts of dihydroxystearic ethyl ester are heated together with 3 parts of abietic acid at 260° centigrade in vacuo until the acid value has been reduced to practically zero. A resinous product is obtained.

What we claim is:—

1. A process of producing condensation products, which comprises heating an aliphatic non-drying hydroxy-carboxylic acid with a resinic acid at a temperature above 200° C.

2. A process of producing condensation products, which comprises heating an aliphatic non-drying hydroxy-carboxylic acid with a resinic acid in vacuo at a temperature above 200° C.

3. A process of producing condensation products, which comprises heating an aliphatic non-drying hydroxy-carboxylic acid ester with a resinic acid at a temperature above 200° C.

4. A process of producing condensation products, which comprises heating a ricinoleic acid with a resinic acid at a temperature above 200° C.

5. A process of producing condensation products, which comprises heating a ricinoleic acid with colophony at a temperature above 200° C.

6. A process of producing condensation products, which comprises heating castor oil with colophony at a temperature above 200° C.

7. A process of producing condensation products, which comprises heating castor oil with colophony in vacuo at a temperature above 200° C.

8. The condensation product of a substance selected from the group consisting of aliphatic, non-drying hydroxy-carboxylic acids and esters of said acids with a resinic acid, said condensation product being obtainable by the process defined in claim 2.

9. A condensation product of a ricinoleic acid with a resinic acid.

10. The condensation product of castor oil with colophony obtainable by the process defined in claim 7.

11. A process of producing condensation products, which comprises heating an aliphatic, non-drying hydroxy-carboxylic acid with a resinic acid at a temperature between about 250° and about 260° C.

12. A process of producing condensation products, which comprises heating an aliphatic, non-drying hydroxy-carboxylic acid with a resinic acid in vacuo at a temperature between about 250° and about 260° C.

13. A process of producing condensation products, which comprises heating a ricinoleic acid with a resinic acid in vacuo at a temperature of about 260° C.

14. A process of producing condensation products, which comprises heating castor oil with colophony at about 260° C., at a pressure of about 15 millimeters mercury gauge.

HANS KRZIKALLA.
WERNER WOLFF.